(12) United States Patent  
Hildebrand et al.

(10) Patent No.: US 8,443,415 B2
(45) Date of Patent: May 14, 2013

(54) SYSTEM AND METHOD OF SUPPORTING TRANSPORT AND PLAYBACK OF SIGNALS

(75) Inventors: John G Hildebrand, Philadelphia, PA (US); Francisco Gonzalez, Atlanta, GA (US); Mark Francisco, Clarksburg, NJ (US); Weidong Mao, West Windsor, NJ (US); Saifur Rahman, Philadelphia, PA (US)

(73) Assignee: NGNA, LLC, Denver, CO (US)

( * ) Notice: Subject to any disclaimer, the term of this patent is extended or adjusted under 35 U.S.C. 154(b) by 0 days.

(21) Appl. No.: 10/597,576

(22) PCT Filed: Jan. 31, 2005

(86) PCT No.: PCT/US2005/002639
§ 371 (c)(1),
(2), (4) Date: Oct. 9, 2007

(87) PCT Pub. No.: WO2005/072394
PCT Pub. Date: Aug. 11, 2005

(65) Prior Publication Data
US 2008/0098445 A1    Apr. 24, 2008

Related U.S. Application Data

(60) Provisional application No. 60/540,161, filed on Jan. 29, 2004, provisional application No. 60/598,241, filed on Aug. 3, 2004.

(51) Int. Cl.
*H04N 7/16* (2006.01)
(52) U.S. Cl.
USPC .......................................................... 725/151

(58) Field of Classification Search .................. 725/131, 725/139, 151
See application file for complete search history.

(56) References Cited

U.S. PATENT DOCUMENTS

| 5,757,909 | A | 5/1998 | Park |
| 5,781,910 | A | 7/1998 | Gostanian et al. |
| 5,909,257 | A * | 6/1999 | Ohishi et al. .................. 348/726 |
| 6,088,451 | A | 7/2000 | He et al. |
| 6,130,898 | A | 10/2000 | Kostreski et al. |
| 6,201,536 | B1 | 3/2001 | Hendricks et al. |
| 6,275,496 | B1 | 8/2001 | Burns et al. |

(Continued)

FOREIGN PATENT DOCUMENTS

| JP | 06-295304 | 10/1994 |
| JP | 10-242961 | 11/1998 |

(Continued)

OTHER PUBLICATIONS

Japanese Patent Application No. 2006-551482—Office Action dated Nov. 8, 2011.

(Continued)

*Primary Examiner* — Brian Pendleton
*Assistant Examiner* — Ryan Stronczer
(74) *Attorney, Agent, or Firm* — Banner & Witcoff, Ltd.

(57) ABSTRACT

A method and system of supporting transport and playback of signals, such as audio, video, and data signals. A reference model configured to support transport of signals according to a baseline, extended mode (1), and extended mode (2) architecture, and a subscriber video device (SVD) configured to support playback of the signals transported according to any of the architectures.

21 Claims, 2 Drawing Sheets

U.S. PATENT DOCUMENTS

| | | | |
|---|---|---|---|
| 6,397,000 B1 * | 5/2002 | Hatanaka et al. | 386/98 |
| 6,463,454 B1 | 10/2002 | Lumelsky et al. | |
| 6,481,012 B1 | 11/2002 | Gordon et al. | |
| 6,539,545 B1 | 3/2003 | Dureau et al. | |
| 6,567,127 B1 | 5/2003 | Orr et al. | |
| RE38,236 E | 8/2003 | Kubota et al. | |
| 6,637,029 B1 | 10/2003 | Maissel et al. | |
| 6,813,643 B2 * | 11/2004 | Perlman | 709/232 |
| 6,876,852 B1 | 4/2005 | Li et al. | |
| 6,886,178 B1 | 4/2005 | Mao et al. | |
| 6,968,394 B1 * | 11/2005 | El-Rafie | 709/245 |
| 6,981,045 B1 | 12/2005 | Brooks | |
| 7,073,187 B1 | 7/2006 | Hendricks et al. | |
| 7,219,367 B2 * | 5/2007 | Briggs | 725/139 |
| 7,228,555 B2 | 6/2007 | Schlack | |
| 7,339,954 B2 * | 3/2008 | Futamata | 370/486 |
| 7,376,829 B2 | 5/2008 | Ranjan | |
| 7,451,475 B1 | 11/2008 | Oz et al. | |
| 7,801,119 B2 | 9/2010 | Sorenson et al. | |
| 2001/0019559 A1 | 9/2001 | Handler et al. | |
| 2002/0031120 A1 * | 3/2002 | Rakib | 370/386 |
| 2002/0046406 A1 * | 4/2002 | Chelehmal et al. | 725/87 |
| 2002/0069420 A1 | 6/2002 | Russell et al. | |
| 2002/0075954 A1 | 6/2002 | Vince | |
| 2002/0091771 A1 | 7/2002 | Agraharam et al. | |
| 2002/0092021 A1 | 7/2002 | Yap et al. | |
| 2002/0147978 A1 | 10/2002 | Dolgonos et al. | |
| 2002/0169823 A1 | 11/2002 | Coulombe et al. | |
| 2002/0188732 A1 | 12/2002 | Buckman et al. | |
| 2002/0188958 A1 | 12/2002 | Miller | |
| 2002/0196939 A1 | 12/2002 | Unger et al. | |
| 2003/0028643 A1 | 2/2003 | Jabri | |
| 2003/0046686 A1 | 3/2003 | Candelore et al. | |
| 2003/0058887 A1 | 3/2003 | Dworkin et al. | |
| 2003/0059047 A1 | 3/2003 | Iwamura | |
| 2003/0088872 A1 | 5/2003 | Maissel et al. | |
| 2003/0126608 A1 | 7/2003 | Safadi et al. | |
| 2003/0135860 A1 | 7/2003 | Dureau | |
| 2003/0200548 A1 | 10/2003 | Baran et al. | |
| 2004/0049787 A1 | 3/2004 | Maissel et al. | |
| 2004/0153207 A1 | 8/2004 | Peck | |
| 2004/0179610 A1 * | 9/2004 | Lu et al. | 375/240.25 |
| 2004/0193712 A1 | 9/2004 | Benenati et al. | |
| 2005/0009519 A1 | 1/2005 | Murai et al. | |
| 2005/0022253 A1 | 1/2005 | Chen et al. | |
| 2005/0028206 A1 | 2/2005 | Cameron et al. | |
| 2005/0050218 A1 | 3/2005 | Sheldon | |
| 2005/0102297 A1 | 5/2005 | Lloyd et al. | |
| 2005/0123001 A1 * | 6/2005 | Craven et al. | 370/486 |
| 2005/0138669 A1 | 6/2005 | Baran | |
| 2005/0175178 A1 | 8/2005 | Candelore et al. | |
| 2009/0138966 A1 | 5/2009 | Krause et al. | |

FOREIGN PATENT DOCUMENTS

| | | |
|---|---|---|
| JP | 2000-076332 | 3/2000 |
| JP | 2002-251530 | 9/2002 |
| JP | 2002-334227 | 11/2002 |
| JP | 2003-016286 | 1/2003 |
| JP | 2003-058717 | 2/2003 |
| JP | 2003-265865 | 9/2003 |
| JP | 2004-187306 | 7/2004 |
| WO | 0079801 | 12/2000 |
| WO | 0155877 | 8/2001 |
| WO | 03071727 | 8/2003 |

OTHER PUBLICATIONS

JP/OA 2006-551483 mailed Feb. 8, 2011.
WO Int. Search Report 2005072389 mailed Sep. 2, 2005.
JP/OA 2006-551482 mailed Feb. 8, 2011.
KR/OA 10-2006-701743 dtd May 18, 2011.
JP/OA 2006-551486 dtd Apr. 5, 2011.
JP/OA 2006-551483 dtd May 31, 2011.
Japanese Patent Application No. 2006-551483—Office Action dated Nov. 22, 2011.
JP Office Action for JP Application No. 2006-551486, mailed Apr. 5, 2011.
Supplementary European Search Report dated Dec. 7, 2011.
The Delivery Layer in MPEG-4, G. Franceschini, Signal Processing, Image Communication, Elsevier Science Publishers, Amsterdam, NL, vol. 15, No. 4-5, Jan. 1, 2000.
Supplementary Partial European Search Report, EP 0571217 4, Dated Mar. 21, 2012.

* cited by examiner

SYSTEM AND METHOD OF SUPPORTING TRANSPORT AND PLAYBACK OF SIGNALS

CROSS-REFERENCE TO RELATED APPLICATIONS

This application claims the benefit of U.S. provisional application Ser. No. 60/540,161 filed Jan. 29, 2004 and U.S. provisional application Ser. No. 60/598,241 filed Aug. 3, 2004, the disclosures of which are hereby incorporated in its entirety.

BACKGROUND OF THE INVENTION

1. Field of the Invention

The present invention relates to methods and systems of supporting transport and playback of signals.

2. Background Art

Cable system operators and other operators providing video and audio (AV) signals to customers typically employ baseline architectures to transport the signals from a headend unit or similar feature to the customer equipment (CE), whether such signals are related to broadcast television, video on demand (VOD), or other services. The baseline architecture multiplexes the AV signals into an AV only transport that is modulated and transmitted over cable or similar transmission means to the CE. One common example relates to cable system that packetize AV signals for transport in MPEG-2 transport streams.

The ability to support bi-directional data communication with the CE and a network, such as the internet, is becoming more advantageous as CE becomes more advanced and capable of manipulating data signals. In the past, architectures supporting bi-directional data communication included a data communication unit separate from the headend unit to multiplex data signals into a data only transport. One common example relates to cable modem termination systems (CMTSs) which are typically located remotely from headends and are configured to packetize and transport data signals in data over cable services interface specification (DOCSIS) transports.

The AV transport and the data transport are separately delivered to the CE over cable or other communication mediums.

SUMMARY OF THE INVENTION

One non-limiting aspect of the present invention relates to a reference model configured for transporting video, audio, and data payloads over a common transport stream, such as transport stream associated with a data over cable services interface specification (DOCSIS).

In accordance with one non-limiting aspect of the present invention, the reference model may include an application layer defining creation of the video, audio, and data signals, a link layer defining multiplexation of the video, audio, and data signals into the common transport, and a physical layer defining transportation of the common transport over the cable system.

The link layer may define multiplexing of the signals based on data over cable services interface specifications (DOCSIS), such as by specifying data packets with packet identifier (PID) 0x1FFE and without an associated adaptation field whereas the audio and video packets are identified with PIDs other than those having the 0x1FFE designation and are associated with an adaptation field for decoder synchronization.

The reference model may further include a transport layer defining management of the video, audio, and data signals and a network layer defining transmission of the video, audio, and data signals between networks. The transport layer may define management based on real-time protocols (RTP), user datagram protocols (UDP), transmission control protocols (TCP), and/or MPEG-2 protocols, and the network layer may define transmission based on internet protocols (IP).

In accordance with one non-limiting aspect of the present invention, the reference model may support transport and playback of AV packets according to a number of different protocols, including a baseline architecture where MPEG AV streams are carried directly over MPEG-2 transport and data packets are carried separately over a DOCSIS MPEG-2 transport such that different transport streams are associated with data and A/V packets, an extended mode 1 where MPEG-2 AV transport packets are combined with DOCSIS data packets in a single DOCSIS MPEG-2 transport stream, and an extended mode 2 where MPEG-2 AV transport packets in RTP payloads over UDP over IP over DOCSIS are combined with DOCSIS data packets in a single DOCSIS MPEG-2 transport stream with the ability to also use other real-time protocols instead of RTP.

One non-limiting aspect of the present invention relates to a subscriber video device (SVD) configured for receiving video, audio, and data signals in a common transport stream and outputting the received signals for playback on a media output device. In accordance with one non-limiting aspect of the present invention, the SVD may receive and playback signals from architectures associated with baseline or extended modes 1 and 2.

In accordance with one non-limiting aspect of the present invention, the SVD may be configured to support playback of AV signals packetized for delivery in an AV only transport associated with AV packets and an integrated transport associated with AV and data packets. In accordance with one non-limiting aspect of the present invention, the AV packets of the integrated transport may only be recovered therefrom through data processing. The SVD may include a switch configured to separate packets associated with AV only transport from packets associated with the integrated transport, a data processor in communication with the switch and configured to separate AV related packets from data related packets included within the integrated transport, and a demultiplexer in communication with the switch and data processor configured to demultiplex AV packets outputted therefrom.

In accordance with one non-limiting aspect of the present invention, the SVD may be configured to support digital television (DTV) signals packetized according MPEG-2 and DOCSIS protocols. The SVD may include a switch configured to separate packets associated with MPEG-2 protocols from packets associated with the DOCSIS protocols, a DOCSIS data processor in communication with the switch and configured to receive the packets associated with the DOCSIS protocols and to separate AV related packets from data related packets included therein, and a demultiplexer in communication with the switch and data processor and configured to demultiplex AV packets outputted therefrom.

The SVD may include a decoder in communication with the demultiplexer configured to decode AV payloads for output to a video port and an audio port. The decoder may be configured for decoding any number of payloads, including those associated with MPEG-2 protocols and advanced video compression (AVC) protocols, such as MPEG-4 and H.264.

The above features and advantages, along with other features and advantages of the present invention, are readily

DETAILED DESCRIPTION OF THE PREFERRED EMBODIMENT(S)

Figure 1:
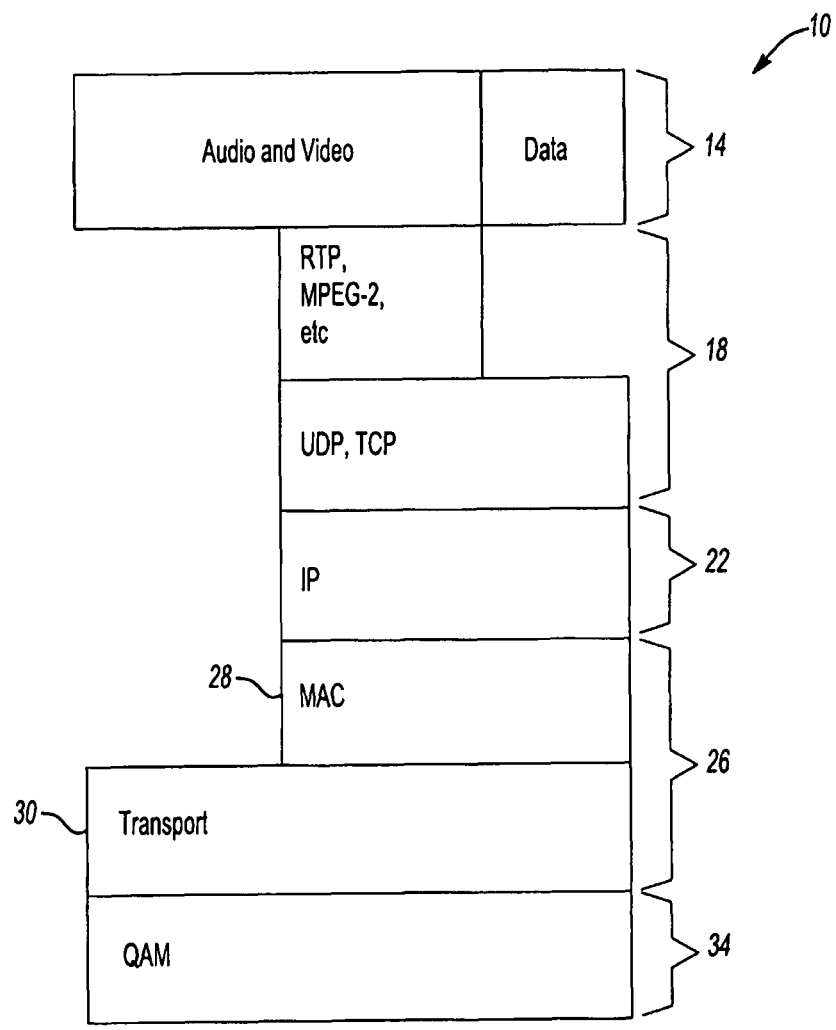
FIG. 1 illustrates a reference model in accordance with one non-limiting aspect of the present invention.

FIG. 1 illustrates a reference model 10 in accordance with one non-limiting aspect of the present invention. The reference model 10 is configured for transporting audio, video, and data payloads over a common transport. In more detail, the reference model may support the combining of packetized audio and video (AV) signals, such as those associated with digital television, and packetized data signals, such as those associated with high speed Internet communications and the like, including web services and application data from servers, over a common transport stream.

The reference model is advantageous for use in cable systems and other environments where it may be desirable to transport multimedia signals (i.e. audio, video, and data) signals over a common transport, such as telecommunication systems. Of course, the present invention contemplates its application in any number of environments and is not intended to limited to cable and telecommunication systems.

The reference model 10 may include an application layer 14 that ultimately results in the creation of video, audio, and data signals. In more detail, the application layer relates to functions and operations through which a user or other operator interfaces to create or manipulate incoming signals. In accordance with one non-limiting aspect of the present invention, the application layer 14 includes an AV application relating to AV signals and a data application relating to data signals, i.e., signals originated from non-AV sources.

Of course, the present invention contemplates the application layer 14 including applications relating to other types of signals, such as a streaming video and data application relating to packetizing digital video stored on a server and other data associated with the streamed video and video services, such as program specific information/system information (PSI/SI). In more detail, the source may include a program specific information/system information (PSI/SI) generator (not show) which receives instructions from providers, vendors, and/or operators at the source or in communication therewith for associating data and information signals with the broadcast television signals. For example, the PSI generator may be configured to provide information regarding specific programs, such as detailed program descriptions, associated program authorizations, conditional access features, interactive tags, program (channel) listing, and the like. Likewise, the SI generator may be configured to provide less specific information, such as elementary stream program identifiers (such as those required to select specific programs from a multiple program transport stream), electronic programming guide (EPG) information, channel maps (in cable systems for example, each provider may be assigned a channel in a channel map which the customer may tune to with their CE to locate the associated television program or other service) content navigation information, tuning information (such as a frequency map of the system), presentation information, and the like.

The reference model 10 may include a transport layer 18 for defining management of signals associated with the applications. In more detail, the transport layer defines protocols and procedures for exchanging and managing the signals, including error recovery and flow control, such as through real-time protocols (RTP), user datagram protocols (UDP), transmission control protocols (TCP), and/or MPEG-2 protocols.

RTP is an Internet-standard protocol included within the transport layer to facilitate the transport of real-time data with robust management, including audio and video associated with the AV applications. It can be used for media-on-demand as well as interactive services such as Internet telephony. RTP consists of a data and a control part commonly referred to a Real-time Transport Control Protocol (RTCP). The data part of RTP is a thin protocol providing support for applications with real-time properties such as continuous media (e.g., audio and video), including timing reconstruction, loss detection, security and content identification. RTP has important properties of a transport protocol, including offering quality-of-service feedback from receivers to the multicast group as well as support for the synchronization of different media streams, source identification and support for gateways like audio and video bridges as well as multicast-to-unicast translators, support for real-time conferencing of groups of any size within an internet, end system operability, demultiplexing capabilities, hooks for adding reliability, where appropriate, and flow/congestion control also referred to as application-level framing.

Of course, the present invention contemplates other applications of RTP, such as making RTP transport-independent so that it could be used over CLNP (Connectionless Network Protocol), IPX (Internet Packet eXchange) or other protocols and directly over AAL5/ATM (ATM Adaptation Layer 5 over Asynchronous Transfer Mode protocol). In more detail, ISO CLNP is a datagram network protocol that provides fundamentally the same underlying service to a transport layer as IP. CLNP provides essentially the same maximum datagram size, and for those circumstances where datagrams may need to traverse a network whose maximum packet size is smaller than the size of the datagram, CLNP provides mechanisms for fragmentation (data unit identification, fragment/total length and offset). Like IP, a checksum computed on the CLNP header provides a verification that the information used in processing the CLNP datagram has been transmitted correctly, and a lifetime control mechanism ("Time to Live") imposes a limit on the amount of time a datagram is allowed to remain in the internet system. As is the case in IP, a set of options provides control functions needed or useful in some situations but unnecessary for the most common communications.

IPX is the networking protocol used in Novell networks. It is an unreliable connectionless internet work protocol that passes packets transparently from source to destination, even if the source and destination are on different networks. IPX is functionally similar to IP except that it uses 12-byte addresses instead of 4-byte addresses. ATM is the underlying technology behind the Broadband Integrated Services Digital Network (B-ISDN) being built by the telephone companies to offer video on demand, live television, electronic mail, music services, high-speed data services, etc. ATM transmits all information in small fixed-size packets called cells. The cells are 53 bytes long (4 bytes header, 48 bytes payload). The ATM layer provides flow control and routing. The AAL is responsible for breaking up the larger application messages at the source into the small, fixed size cells of the ATM layer and then reassembling them at the destination into their original form.

In addition to the foregoing real-time management, the services of the transport layer 18 may include UDP transport protocol which is an unreliable, connectionless protocol for applications that may desire less management than TCP's sequencing or flow control. It is also widely used for one-shot, client-server type request-reply queries and applications in which prompt delivery is more important than accurate delivery, such as transmitting speech or video.

In accordance with one non-limiting aspect of the present invention, signals associated with the data applications may not be processed according to RTP, MPEG-2 or other similar real-time protocols. This is done, at least in part, because the data applications typically do not require real-time delivery and are therefore not sensitive to system delay and jitter, thus permitting the use of standard TCP transport protocols. In contrast, however, the AV signals may require more robust management, such as if the AV signals are to be transported over a packet switching network that should not be subject to extreme network delay and jitter, and as such, are preferably associated with one of the above described real-time protocols.

In more detail, TCP is a reliable connection oriented protocol that allows a byte stream originating in one machine to be delivered without error to any other machine in the Internet. It fragments the incoming byte stream into discrete messages and passes each one onto the Internet layer. At the destination, the receiving TCP process reassembles the received messages into the output stream. TCP also handles flow control to make sure a fast sender cannot swamp a slow receiver with more messages than it can handle.

The reference model 10 may include a network layer 22 for defining transmission of the signals processed according to the transport layer 18 so as to permit the transmission of the signals between networks. In more detail, the network layer 22 controls signals transmission between computers, address and routing between networks, such through internet protocols (IP). IP is the Internet's official packet format and protocol and uses IP protocols to route and deliver IP packets to correct destinations.

The reference model 10 may include a link layer 26 defining multiplexation of the video, audio, and data signals into a common transport. The link layer 26 may include a MAC layer 28, such as a DOCSIS MAC, to allocate bandwidth, resolve contention, and guarantee the proper quality of service (QoS). In more detail, a DOCSIS MAC layer may be used to arbitrate access to the system resources, especially access to the shared downstream and uplink medium and transforms upper layer structures such as IP datagrams from the network layer into DOCSIS frames and then breaks up those frames so that they fit within the fixed-length MPEG-2 transport packets. In this manner, DOCSIS frames may begin anywhere within the MPEG packet and may span several MPEG packets wherein the first byte of the MPEG payload is typically a 'pointer field' that points to the start of the DOCSIS frame within an MPEG packet, and in some cases, stuffing bytes (0xFF) are used to fill the gap between DOCSIS MAC frames.

In addition, the link layer 26 may include a transport layer 30 for multiplexing the AV packets and data packets into a common transport stream. The multiplexing may take place between data signals and AV signals processed according the transport and network layers 18, 22, or in accordance with one limiting aspect of the present invention, with AV signals which bypass the transport and network layers 18, 22. In more detail, for some AV signals, it may be unnecessary to process AV signals for packetized transport over wide area networks and therefore unnecessary to include the features associated with the above-described transport and network layers 18, 22, i.e., RTP, UDP, TCP, IP, and MAC, which are commonly used if the AV signals are transported over a packet switching network. Rather, the AV signals may be communicated directly to a multiplexer through non-packet switching means to be multiplexed with the data signals and/or other AV signals processed through the transport and link layers.

In accordance with one non-limiting aspect of the present invention, the transport layer 30 may combine the signals into a MPEG-2 transport stream of 188 byte MPEG packets composed of a 4 byte header and 184 byte payload. In accordance with one non-limiting aspect of the present invention, the common transport stream differentiates AV packets from data packets using DOCSIS procedures and protocols, such as those included in a DOCSIS transmission convergence sub-layer. In more detail, this includes identifying data packets by a packet identifier (PID) 0x1FFE in the MPEG-2 transport header and without an associated adaptation field whereas the AV packets are identified with PIDs other than those having the 0x1FFE designation and are associated with an adaptation field for decoder synchronization. Of course, the present invention is not intended to be limited to the use of the DOCSIS downstream transmission convergence sub-layer and contemplates the use of other packet identifying logic for differentiating between AV packets and DOCSIS data packets.

The reference model 10 may include a physical layer 34 defining transportation of the common transport over the cable system. In more detail, the physical layer 34 defines processes and procedures for transporting the common transport over hybrid fiber cables, such as through quadrature amplitude modulation (QAM), or through other means, such as wireless networks (terrestrial and extraterrestrial)

As described above, the reference model 10 supports transporting the AV packets according to a number of different protocols, including a baseline architecture where MPEG AV streams are carried directly over MPEG-2 transport and data packets are carried separately over a DOCSIS MPEG-2 transport such that different transport streams are associated with data and A/V packets, an extended mode 1 where MPEG-2 AV transport packets are combined with DOCSIS data packets in a single DOCSIS MPEG-2 transport stream, and an extended mode 2 where MPEG-2 AV transport packets in RTP payloads over UDP over IP over DOCSIS are combined with DOCSIS data packets in a single DOCSIS MPEG-2 transport stream with the ability to also use other real-time protocols instead of RTP.

Figure 2:
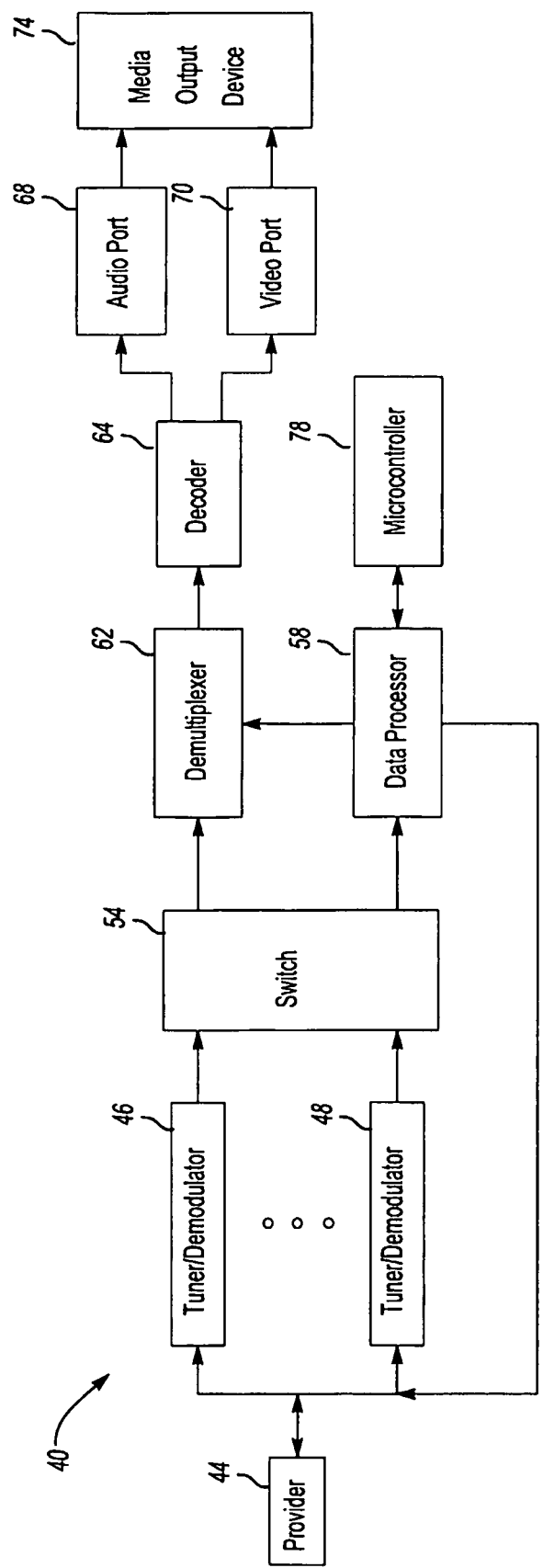
FIG. 2 illustrates a flexible subscriber video device (SVD) in accordance with one non-limiting aspect of the present invention.

FIG. 2 illustrates a flexible subscriber video device (SVD) 40 in accordance with one non-limiting aspect of the present invention. The SVD 40 may be integrated into a settop box (STB) or other feature for receiving and manipulating signals from a cable provider, such as a digital video recorder (DVR), media terminal adapter (MTA), outlet digital adapter (ODA), and the like. The present invention contemplates the use of the SVD 40 in other applications besides cable system and is not intended to be so limited.

FIG. 2 illustrates the SVD 40 configured for supporting signals carried in different transports. In more detail, the SVD 40 may be configured to support AV only transports, such as those associated with the baseline architectures, and integrated transports having both AV packets and data packets, such as those associated with the reference model (extended modes 1 and 2) described above.

In accordance with one non-limiting aspect of the present invention, the SVD 40 may be a settop box (STB) unit configured to receive digital television signals, data signals, out-of-band messaging signals, and the like from a cable service provider 44. In particular, the SVD 40 may be configured to receive MPEG-2 AV transport streams, MPEG-2 DOCSIS transport steams having AV packets and data packets (DOCSIS payloads), and other common/integrated transports having separately identified data and AV packets. The SVD 40 may be integrated in any number of devices to provide a flexible architecture capable of supporting multiple transport protocols.

The SVD 40 may include a tuner and demodulator to tune to and demodulate signals provided thereto in order to recover a transport stream. In one non-limiting aspect of the present invention, tuner and demodulator units 46 and 48 are configured to select a CATV 6 MHz RF carrier in a band between 52 an 1002 MHz and to demodulate the quadrature amplitude modulated signals. The pair of units 46, 48 are provided to supported simultaneous playback and record, however, the present invention contemplates the use of more less of the units 46, 48. The unit 46, 48 output a packetized transport stream to a switch 54 configured to separate AV packets from integrated packets (i.e., those having both AV and non-AV data packets such as DOCSIS payloads).

A data processor 58, such as a DOCSIS processor, communicates with the switch 54 to receive the integrated packets and processes the packets to separate AV related packets from data related packets. For example, the data processor 54 may recover AV related packets included within an integrated transport having both AV and non-AV data packets packetized according to data transmission protocols, such as DOCSIS, which prevent such AV packets from being recovered by a demultiplexer 62, such as those included therewith according the first and second reference models described above.

The demultiplexer 62 communicates with the switch 54 and the data processor 58 to receive the AV packets outputted therefrom, i.e. those outputted directly from the switch 54 and those recovered by the data processor 58. The demultiplexer 62 locates the AV payloads associated therewith according to information included within the packets and outputs the signals to a decoder 64. The decoder 64 decodes the AV payloads, which may be payloads compressed according to any number of compression protocols, such as advanced video compression protocols, like MPEG-4 and H.264, and legacy compression protocols, like MPEG-2.

The decoder 64 outputs the decoded AV payloads to a video port 68 and an audio port 70. A media output device 74, such as a television, digital video recorder (DVR), or other feature, may be connected to the ports for recording or playback of the AV signals. A microprocessor 78 or other data packet processing unit may communicate with the data processor to manipulate the data packets included therewith, such as to facilitate communication with a remote network and the like. The microprocessor, 78 for example, may be associated with a cable modem or other bidirectional device such that it may be further configured to communication upstream signals through the data processor 58, which packetizes the signals for upstream network communication.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus comprising:
   a tuner configured to tune to a radio frequency (RF) carrier frequency associated with an AV only transport associated with AV signals and an integrated transport associated with AV packets and data packets;
   a demodulator configured to demodulate the tuned transports for output to a switch;
   the switch configured to simultaneously separate the AV signals associated with the AV only transport from the AV packets and data packets associated with the integrated transport;
   a data processor in communication with the switch and configured to separate the AV packets from the data packets included within the integrated transport;
   a demultiplexer in communication with the switch and the data processor configured to process AV payloads both from the separate AV packets of the integrated transport and from the AV signals of the AV only transport, wherein the AV signals of the AV only transport are received directly from the switch and wherein the AV packets associated with the integrated transport are received through a signaling pathway in which the switch outputs the integrated transport associated with the AV packets directly to the data processor and the data processor outputs the AV packets directly to the demultiplexer; and
   a decoder in communication with the demultiplexer and configured to decode the AV payloads for output to a video port and an audio port.

2. The apparatus of claim 1 wherein the AV only transport is associated with a baseline architecture.

3. The apparatus of claim 1 wherein the integrated transport is associated with an extended mode 1 architecture.

4. The apparatus of claim 1 wherein the integrated transport is associated with an extended mode 2 architecture.

5. The apparatus of claim 1 wherein the decoder is configured for decoding the AV payloads compressed according to MPEG-2 protocols.

6. The apparatus of claim 1 wherein the decoder is configured for decoding the AV payloads compressed according to advanced video compression (AVC) protocols.

7. The apparatus of claim 6 wherein the AVC protocols are associated with MPEG-4.

8. The apparatus of claim 6 wherein the AVC protocols are associated with H.264.

9. The apparatus of claim 1 further comprising a cable modem in communication with the data processor for processing the data packets.

10. An apparatus comprising:
    a switch configured to simultaneously route a first transport to a demultiplexer and a second transport to a data processor, the first transport having packets with only AV payloads and the second transport having packets with AV payloads and other packets with data payloads;
    wherein the demultiplexer is configured to process AV payloads on the first transport received directly from the switch and AV payloads on the second transport received through a signaling pathway in which the switch outputs the second transport directly to the data processor and the data processor outputs the AV payloads on the second transport directly to the demultiplexer; and
    wherein the data processor is configured to separate the AV payloads from the data payloads carried in the second transport and to output the AV payloads to the demultiplexer and the data payloads to a microprocessor such that an SVD is configured to simultaneously receive both of a first and second transport stream and to decode and process the associated AV payloads and data payloads.

11. The apparatus of claim 2 wherein the baseline architecture consists of a scheme in which MPEG AV streams are carried directly over MPEG-2 transport and the data packets are carried separately over a DOCSIS MPEG-2 transport such that different transport streams are associated with the data packets and the AV packets.

12. The apparatus of claim 3 wherein the extended mode 1 architecture consists of a scheme in which MPEG-2 AV transport packets are combined with DOCSIS data packets in a single DOCSIS MPEG-2 transport stream.

13. The apparatus of claim 4 wherein the extended mode 2 architecture consists of a scheme in which MPEG-2 AV transport packets in RTP payloads over UDP over IP over DOCSIS are combined with DOCSIS data packets in a single DOCSIS MPEG-2 transport stream.

14. A method comprising:
receiving, at a demultiplexer, AV signals associated with an AV only transport from a switch, wherein the AV signals have been separated from packets associated an integrated transport;
receiving, at the demultiplexer, AV packets separated from data packets included within the integrated transport from a data processor;
demultiplexing, at the demultiplexer, AV payloads both from the AV packets and from the AV signals wherein the AV signals of the AV only transport are received directly from the switch and wherein the AV packets of the integrated transport are received through a signaling pathway in which the switch outputs the integrated transport directly to the data processor and the data processor outputs the AV packets on the integrated transport directly to the demultiplexer; and
forwarding the AV payloads for decoding to a decoder and outputting the decoded payloads to a video port and an audio port.

15. The method of claim 14 wherein the AV only transport is associated with a baseline architecture.

16. The method of claim 14 wherein the integrated transport is associated with an extended mode 1 architecture.

17. The method of claim 14 wherein the integrated transport is associated with an extended mode 2 architecture.

18. The method of claim 14 wherein the decoding decodes the AV payloads compressed according to MPEG-2 protocols.

19. The method of claim 14 wherein the decoding decodes the AV payloads compressed according to advanced video compression (AVC) protocols.

20. The method of claim 19 wherein the AVC protocols are associated with MPEG-4.

21. The method of claim 19 wherein the AVC protocols are associated with H.264.

* * * * *

UNITED STATES PATENT AND TRADEMARK OFFICE
CERTIFICATE OF CORRECTION

PATENT NO.       : 8,443,415 B2                                             Page 1 of 1
APPLICATION NO.  : 10/597576
DATED            : May 14, 2013
INVENTOR(S)      : John Hildebrand et al.

It is certified that error appears in the above-identified patent and that said Letters Patent is hereby corrected as shown below:

On the Title page, under item (75) Inventors:
    Please delete "John G. Hildebrand, Philadelphia, PA (US)" and replace with
--John G. Hildebrand, Lawrenceville, GA (US)--

In the Claims
In Column 9, Claim 13, Line 15:
    Please delete "2architecture" and replace with --2 architecture--

Signed and Sealed this
Seventh Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,443,415 B2  
APPLICATION NO. : 10/597576  
DATED : May 14, 2013  
INVENTOR(S) : Hildebrand et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 848 days.

Signed and Sealed this
Eighth Day of September, 2015

Michelle K. Lee
*Director of the United States Patent and Trademark Office*